United States Patent
Morin

(10) Patent No.: US 7,287,513 B2
(45) Date of Patent: Oct. 30, 2007

(54) METHOD FOR CONTROLLING THE INTAKE VALVES OF AN INTERNAL COMBUSTION ENGINE

(75) Inventor: Cédric Morin, Meudon (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/595,220

(22) PCT Filed: Sep. 28, 2004

(86) PCT No.: PCT/FR2004/050466

§ 371 (c)(1),
(2), (4) Date: Mar. 24, 2006

(87) PCT Pub. No.: WO2005/033495

PCT Pub. Date: Apr. 14, 2005

(65) Prior Publication Data

US 2007/0028894 A1    Feb. 8, 2007

(30) Foreign Application Priority Data

Sep. 30, 2003   (FR) .................................. 03 11447

(51) Int. Cl.
*F02D 13/02* (2006.01)
*F02D 41/36* (2006.01)

(52) U.S. Cl. ....................... 123/432; 123/481

(58) Field of Classification Search ............ 123/198 F, 123/308, 432, 481
See application file for complete search history.

(56) References Cited

U.S. PATENT DOCUMENTS

| | | | |
|---|---|---|---|
| 4,938,191 A * | 7/1990 | Oldani et al. ................ 123/432 |
| 5,379,743 A | 1/1995 | Stokes et al. | |
| 5,531,203 A * | 7/1996 | Komatsuda et al. ........ 123/481 |
| 5,803,040 A * | 9/1998 | Biesinger et al. ........ 123/198 F |
| 6,431,154 B1 * | 8/2002 | Inoue ........................ 123/481 |
| 6,499,456 B1 | 12/2002 | Nogi et al. | |
| 6,619,267 B1 * | 9/2003 | Pao ............................ 123/481 |
| 6,688,275 B2 * | 2/2004 | Shindou et al. .......... 123/198 F |
| 6,962,143 B2 * | 11/2005 | Ryan et al. ................. 123/481 |

FOREIGN PATENT DOCUMENTS

| | | | |
|---|---|---|---|
| EP | 0594462 A | 4/1994 |
| EP | 1130240 A | 9/2001 |

* cited by examiner

*Primary Examiner*—T. M. Argenbright
(74) *Attorney, Agent, or Firm*—Nicolas E. Seckel

(57) ABSTRACT

The invention relates to a method for controlling the opening and closing of the intake valves of an internal combustion engine with a direct fuel injection system, comprising at least one first intake valve and a second intake valve per cylinder, wherein each valve respectively opening or closing a first and second intake duct per cylinder can be controlled independently of the other valve, wherein at least one of the ducts is supplied with fuel and at least one of the other ducts is not supplied with fuel. According to the invention, said method consists in controlling the valve or valves corresponding to the intake ducts supplied with fuel during the time intervals when the injection system does not function. The invention also relates to a system for the application of said method.

4 Claims, 1 Drawing Sheet

METHOD FOR CONTROLLING THE INTAKE VALVES OF AN INTERNAL COMBUSTION ENGINE

Figure 1:
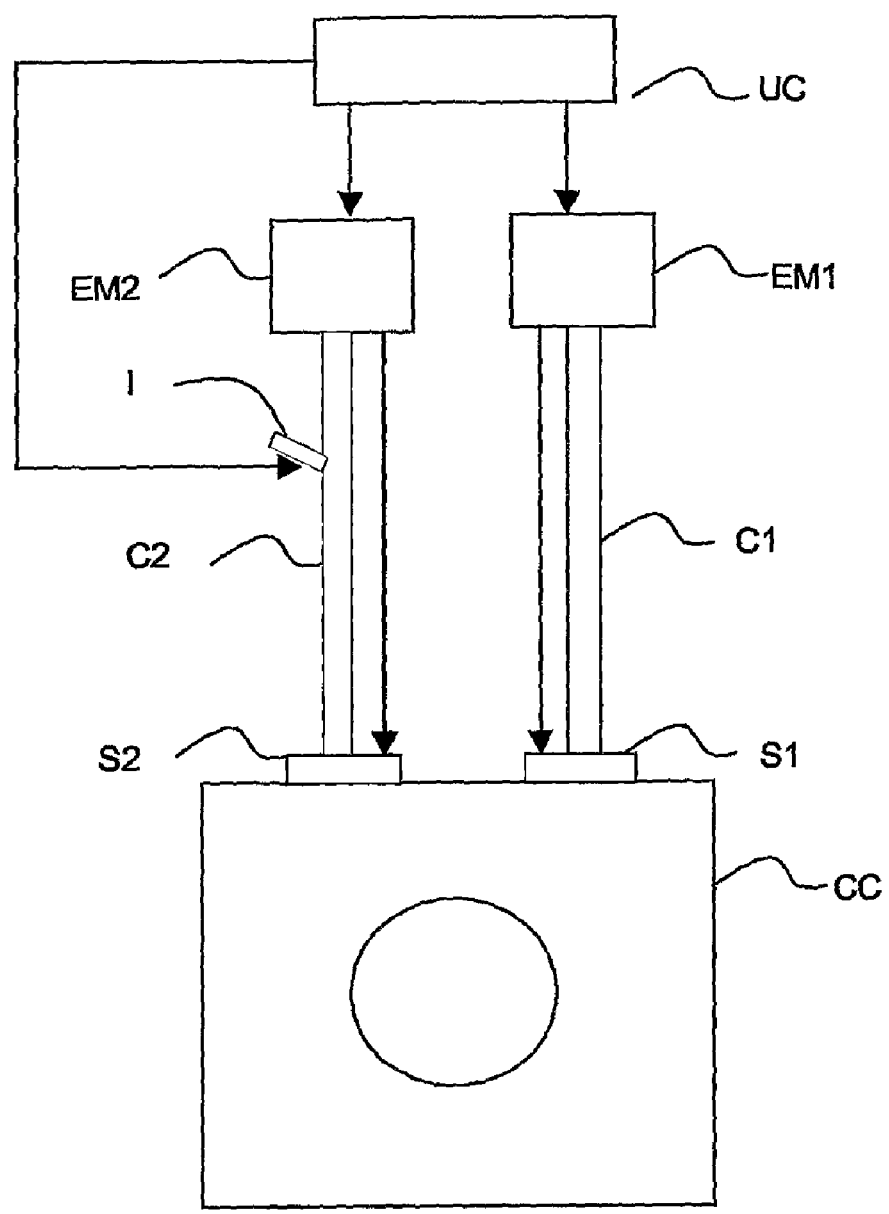

The present invention concerns a method for controlling the intake valves of an internal combustion engine comprising a driven, indirect fuel injection system and comprising at least two intake valves per cylinder, controlled independently from one another. It also concerns a system for implementing this method.

It applies in particular to a gasoline engine of a motor vehicle.

On engines comprising a driven indirect fuel injection system, it is known that, when the driver takes his foot off the accelerator, the fuel injection piloting system cuts the fuel supply to the intake pipes and thus to the engine cylinders. As a result, the engine does not produce any torque, which causes the vehicle to slow down. This braking configuration called "engine brake" avoids useless fuel consumption.

Similarly, it is known that, when the engine exceeds a maximum authorized speed, the fuel injection driving system cuts the fuel supply so that the engine does not produce any torque and the engine speed is reduced below the maximum authorized threshold. In this way, the system ensures the protection of the engine.

Finally, it is admitted that, during these phases of cutting the fuel supply, either in the case of the engine brake or in the case of exceeding the maximum authorized engine speed, the engine can keep being supplied with air by the intake system. Indeed, the air volumes admitted into the cylinders travel through the exhaust line and participate to the cooling of the catalytic converter, as too high temperatures are detrimental to its preservation.

However, at the beginning of these phases of cutting the fuel injection, a small amount of fuel that was already deposited on the walls of the intake pipes is sucked in with the air into the cylinders. Taking into account its low concentration in the air sucked in, this residual amount of fuel cannot be burned in the combustion chamber of the cylinders and is rejected into the exhaust during the expulsion phase of the gases from the cylinders.

As a result, the unburned hydrocarbons constitute, at the exit of the engine, important raw polluting emissions, as compared to the emissions observed when combustion takes place. The presence of these unburned hydrocarbons in the exhaust line poses two types of problems.

On the one hand, when the catalytic converter has not been started in operation or is partially started or damaged, these unburned hydrocarbons are only partially oxidized, or even are not oxidized in the catalytic converter, and a portion thereof is sent into the atmosphere, at the exit of the exhaust line.

On the other hand, when the catalytic converter has been started in operation, and as soon as it has reached a temperature above 400° C., it contributes to oxidize, pursuant to an exothermic reaction, the hydrocarbons, thanks to the oxygen present in the exhaust line. However, when the catalytic converter is at a temperature above 900° C., this exothermic reaction triggers an additional temperature increase that can result in partially damaging the catalytic converter. This situation, which corresponds to a strong acceleration followed by a release of the accelerator pedal to go into engine brake mode, or to exceeding the maximum authorized engine speed following a strong acceleration, which is likely to be encountered quite frequently, there follows a progressive deterioration of the catalytic converter which then does not comply anymore with specifications in terms of its useful life and performance preservation.

Thus, the cuts in the fuel supply have consequences that go against the respect of environmental norms, namely:
- additional emissions of hydrocarbons, raw polluting emissions, when the catalytic converter is not completely started in operation or is damaged.
- a degradation of the catalytic converter which leads progressively to a dysfunction of the latter, when the catalytic converter is started in operation.

The solution generally envisioned, for indirect fuel injection engines, consists in prohibiting cuts in the fuel injection in the case where the catalytic converter is not started in operation, i.e., when the vehicle is started cold. This makes it possible to maintain the combustion of the air/fuel mixture in the cylinders and to avoid the emission of hydrocarbons at the exit of the cylinders. However, it is not desirable to generalize this prohibition outside of this case, since, on the one hand, the fuel consumption of the vehicle would then be substantially increased, and on the other hand, operation of the engine would be strongly altered.

A goal of the invention is thus to allow cutting injection each time the driver takes his foot off the accelerator and each time the engine exceeds a maximum authorized engine speed, while avoiding that this cut in the injection result in the drawbacks discussed above, namely, in particular, an additional emission of hydrocarbons into the atmosphere or a damage to the catalytic converter.

More precisely, the invention concerns a method for controlling the opening and closing of the intake valves of an internal combustion engine comprising an indirect fuel injection system, comprising at least a first intake valve and a second intake valve per cylinder, each valve making it possible to close or open a first and a second intake pipes, respectively, of the cylinder, and being controlled independently from the other valve, at least one of the pipes being supplied with fuel and at least one of the other pipes not being supplied with fuel.

According to the inventor, the method consists in controlling the closing of the valve(s) corresponding to the admission pipe(s) supplied with fuel during the time intervals where the injection system does not operate.

The invention also concerns a system for controlling the closing and opening of intake valves of an internal combustion engine comprising an indirect fuel injection system, comprising at least a first intake valve and a second intake valve per cylinder, each valve being controlled independently from the other valve by an actuating device to close or open a first and a second intake pipes, respectively, of the cylinder, at least one of the pipes being equipped with a driven fuel injection device and at least one of the other pipes not being equipped with a fuel injection device, and comprising means for controlling the fuel injection device characterized in that it comprises a central unit making it possible to control the actuating devices so as to close the valve(s) corresponding to the intake pipe(s) equipped with a fuel injection device during the time intervals where the means for controlling the fuel injection devices cut the operation of the latter.

The invention will be better understood with the assistance of the embodiment represented on FIG. 1 and provided as an example.

On FIG. 1 is shown a cylinder CC of an internal combustion engine, a first intake valve S1 and a second intake valve S2, each valve being controlled independently from the other valve by an actuating device EM1, EM2 to close or open a first and a second intake pipe, respectively C1, C2, of the cylinder CC. The pipe C2 is equipped with a driven fuel injection device I whereas the pipe C2 is separated from the pipe C2 and is not supplied with fuel. A central control unit UC makes it possible to control, on the one hand, the driven fuel injection device I, and on the other hand, the actuating devices EM1, EM2 of the valves S1, S2 so as to control the opening and closing of the valves S1, S2 independently from each other.

When the central unit UC controls the driven fuel injection device I to cut the injection of fuel into the intake pipe C2, it sends simultaneously to the actuating device EM2 an instruction to close the valve S2. Thus, the fuel present on the walls of the pipe C2 and the air sent into the pipe C2 can no longer reach the cylinder CC. It will be observed that the fuel present on the walls of the intake pipes is consumed as soon as the actuating device EM2 is activated again in conjunction with the driven fuel injection device 1. During the time intervals when injection is cut, the valve S1 is actuated by the actuating device EM1, so that the pipe C1 supplies the cylinder CC with air.

Thus, when injection is cut, no unburned hydrocarbon is sent into the exhaust line and the air flow at the exit of the engine is preserved to contribute to the cooling of the catalytic converter.

Of course, the invention is not limited to the embodiment of FIG. 1, which is provided only as an example.

Thus, each cylinder of the engine could comprise more than two valves, and thus more than two intake pipes, provided that at least one of the pipes be supplied with fuel and at least one of the other pipes is not.

These pipes can be separated from each other or they can be Siamese twins.

Further, the control units of the injection device 1 and of the actuating devices EM1, EM2 could be distinct.

The invention claimed is:

1. Method for controlling the opening and closing of intake valves of an internal combustion engine comprising an indirect fuel injection system, comprising at least a first intake valve-and a second intake valve per cylinder, each valve making it possible to close or open a first and a second intake pipes, respectively, of the cylinder and being controlled independently from the other valve, at least one of the pipes being supplied with fuel and at least one of the other pipes not being supplied with fuel, wherein the method comprises controlling the closing of the valve(s) corresponding to the intake pipe(s) supplied with fuel during the time intervals when the injection system does not operate, and during these time intervals, controlling the opening of the intake valve(s) corresponding to the intake pipe(s) not supplied with fuel, so as to supply the cylinder with air.

2. System for controlling the opening and closing of the intake valves of an internal combustion engine comprising an indirect fuel injection system, comprising at least a first intake valve and a second intake valve per cylinder, each valve being controlled independently from the other valve by an actuating device for closing and opening a first and a second intake pipes, respectively, of the cylinder, at least one of the pipes being equipped with a driven fuel injection device and at least one of the other pipes not being equipped with a fuel injection device, and comprising means for controlling the fuel injection device, wherein said system comprises a central unit making it possible to control the actuating devices so as to (i) close the valve(s) corresponding to the intake pipe(s) equipped with a fuel injection device during the time intervals when the means for controlling the fuel injection device cut operation of the latter, and (ii) during these time intervals, open the intake valve(s) corresponding to the intake pipe(s) not supplied with fuel, in order to supply the cylinder with air.

3. The method of claim 1, wherein the air flow at the exit of the engine is preserved during these time intervals.

4. The system of claim 2, wherein the air flow at the exit of the engine is preserved during these time intervals.

* * * * *